(12) United States Patent
Ruffa

(10) Patent No.: US 12,270,721 B1
(45) Date of Patent: Apr. 8, 2025

(54) REMOTE TENSION MEASUREMENT SYSTEM

(71) Applicant: The United States of America as represented by the Secretary of the Navy, Newport, RI (US)

(72) Inventor: Anthony A Ruffa, Hope Valley, RI (US)

(73) Assignee: The United States of America as represented by the Secretary of the Navy

( * ) Notice: Subject to any disclaimer, the term of this patent is extended or adjusted under 35 U.S.C. 154(b) by 486 days.

(21) Appl. No.: 17/833,994

(22) Filed: Jun. 7, 2022

(51) Int. Cl.
*G01L 5/04* (2006.01)
*G01L 1/16* (2006.01)
*G01L 1/25* (2006.01)

(52) U.S. Cl.
CPC ............... *G01L 5/042* (2013.01); *G01L 1/16* (2013.01); *G01L 1/162* (2013.01); *G01L 1/255* (2013.01); *G01L 5/045* (2013.01)

(58) Field of Classification Search
CPC . G01L 5/042; G01L 5/045; G01L 1/16; G01L 1/162; G01L 1/165; G01L 1/167; G01L 1/255
See application file for complete search history.

(56) References Cited

U.S. PATENT DOCUMENTS

| | | | | | |
|---|---|---|---|---|---|
| 3,854,329 | A | * | 12/1974 | Jones | ............... G01L 5/042 73/862.41 |
| 4,073,007 | A | * | 2/1978 | Boivin | ............... G01L 5/042 702/43 |
| 4,335,603 | A | * | 6/1982 | Locke | ............... G01L 5/042 73/159 |
| 4,833,928 | A | * | 5/1989 | Luukkala | ............... G01L 5/042 73/862.391 |
| 5,052,233 | A | | 10/1991 | Rantala | |
| 6,481,275 | B1 | | 11/2002 | Koivukunna | |
| 6,629,659 | B1 | | 10/2003 | Innala | |
| 6,769,297 | B2 | | 8/2004 | Virtanen | |
| 6,948,378 | B2 | | 9/2005 | Solberg | |

* cited by examiner

*Primary Examiner* — Paul M. West
(74) *Attorney, Agent, or Firm* — James M. Kasischke; Michael P. Stanley; Jeffry C. Severson

(57) ABSTRACT

A remote tension measurement system and method of use is provided for detection and estimation of tension in two-dimensional and three-dimensional inflatable structures. Given a spacing distance and a known mass of the membrane-formed structure, measurement points are determined to define a measurement region of the structure. A non-invasive sensor monitors the measurement points to detect a transverse wave moving along the measurement region at an angle to a straight path between measurement points. Propagation speed for the transverse wave is calculated and tension for the measurement region is deduced from the calculation. The solution exploits either proactively introduced, pre-existing, induced by normal environmental conditions) and/or multiple transverse vibrations in the membrane-formed structure. Propagation speed is calculated deterministically based on an analysis of the arrays of measurement points.

13 Claims, 6 Drawing Sheets

REMOTE TENSION MEASUREMENT SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER APPLICATIONS

None.

BACKGROUND OF THE INVENTION (1) Field of the Invention

The present invention relates to the monitoring of operations, damage identification, and impact assessment for inflatable and/or membrane-formed structures.

(2) Description of the Related Art

Inflatable soft structures technologies provide unique solutions to numerous naval operational challenges. Advancements in complementary technologies such as high-performance fibers, fabric architectures and three-dimensional woven preforms, continuous weaving processes and robust physics-based modeling methods can be accessed for the development of solutions to soft structure design challenges requiring on-demand deployment capabilities, significant load-carrying capacities, shock mitigation and dynamic energy absorption.

Inflatable soft structures are large and tensioned membranes that can be formed into larger structures with tension being the primary force that supports the structure. Because measuring tension can provide safety verification and dynamics information; development of less invasive technologies for estimating tension has been the focus of significant research.

As such, a continuing need exists for minimal invasive technology for measuring tension in inflatable and membrane-formed systems during operations, testing and for structural health monitoring.

BRIEF SUMMARY OF THE INVENTION

Accordingly, it is a primary object and general purpose of the present invention to estimate the tension of two-dimensional surfaces and three-dimensional inflatable structures by minimally invasive measurement methods.

A system and method of use is provided for remote tension measurement of membrane-formed structures. The system comprises processors configured with executable instructions: to initialize baseline values such as a spacing distance and a known mass of the membrane-formed structure; to determine measurement points, based on the baseline values; to define a measurement region of the membrane-formed structure; to detect a propagation event for a transverse wave moving along the measurement region; to determine a propagation speed for the transverse wave; and to determine a tension for the measurement region based on the propagation speed. Instructions may also include detecting a mismatch between a propagation speed and a threshold value in order to report an alert condition.

In the invention, the executable instructions define a pair of measurement points positioned along an imaginary line at an input spacing distance when the propagation speed is based on a time delay for the detected transverse wave propagating along a displacement perpendicular to the imaginary line.

For a transverse wave propagating between the pair of measurement points at a displacement angle "$\alpha$" to the imaginary line; determining the propagation speed for the transverse wave uses "$c/\cos \alpha$", where "c" is the propagation speed and "$0<\alpha<\pi/2$".

To analyze uncontrolled or multiple transverse vibrations in a membrane-formed structure; the instructions are configured to define the measurement region using a line array of at least two measurement points and preferably three measurement points positioned along an imaginary line at the spacing distance. Determining the propagation speed of the transverse wave is based on a k-w plot acoustic cone about the imaginary line.

The executable instructions may define the measurement region using a Mills Cross array of at least a first three measurement points positioned along a first imaginary line and another at least three measurement points positioned along a second imaginary line with all measurement points at the spacing distance. Determining the propagation speed "c" for the transverse wave propagating along a displacement angle "$\alpha$" to the first imaginary line and along a displacement angle "$\pi/2-\alpha$" to the second imaginary line may employ "$c/\cos \alpha$" with respect to the first imaginary line and "$c/\sin \alpha$" with respect to the second imaginary line.

The executable instructions may determine tension for the measurement region in air using $$"c=\sqrt{\frac{T}{\mu}};$$

where "T" is the tension per unit length acting in all directions, "$\mu$" is known mass per unit area and "c" is propagation speed.

The executable instructions may also determine tension for the measurement region in surrounding water using $$c = \sqrt{\frac{T}{\mu + \mu_a}};$$

wherein "T" is tension, "$\mu$" is known mass per unit area, "$\mu_a$" is the added mass per unit area of the surrounding water, and "c" is propagation speed.

These and other objects, features, and advantages of the present invention will become more readily apparent from the attached drawings and the detailed description of the invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

The remote tension measurement system described herein is minimally invasive or even non-invasive when determining the characteristics of a structural element.

The measurement system exploits transverse vibrations propagating along two-dimensional surfaces and a three-dimensional inflatable structure in order to determine various characteristics of the structure. Embodiments of the present invention measure the propagation speed of such vibrations to make inferences regarding vibration properties and, by extension, the structural health of the inflatable system.

In a first propagation speed estimation, a tension measurement system uses a partial differential equation that governs transverse waves propagating in the x-y plane in a flat membrane. Neglecting shearing forces and bending moments, Equation (1) recites:

$$\frac{\partial^2 u}{\partial x^2} + \frac{\partial^2 u}{\partial y^2} = \frac{1}{c^2} \frac{\partial^2 u}{\partial t^2} \quad (1)$$

where "u" is a transverse displacement perpendicular to the x-y plane, "x" and "y" are the local orthogonal coordinates, "t" is time, and "c" is the propagation speed, calculated by Equation (2):

$$c = \sqrt{\frac{T}{\mu}} \quad (2)$$

where "T" is the tension per unit length acting in all directions, and "μ" is the mass per unit area of the membrane.

Equation (2) remotely estimates the tension per unit length of an inflatable structure, or a two-dimensional or three-dimensional structure or surface, using a non-invasive sensor such as a laser vibrometer. For example, an interferometer can non-invasively measure Doppler frequency shifts of a laser beam projected across a membrane structure in order to detect the impact of transverse waves on the membrane.

Figure 1:
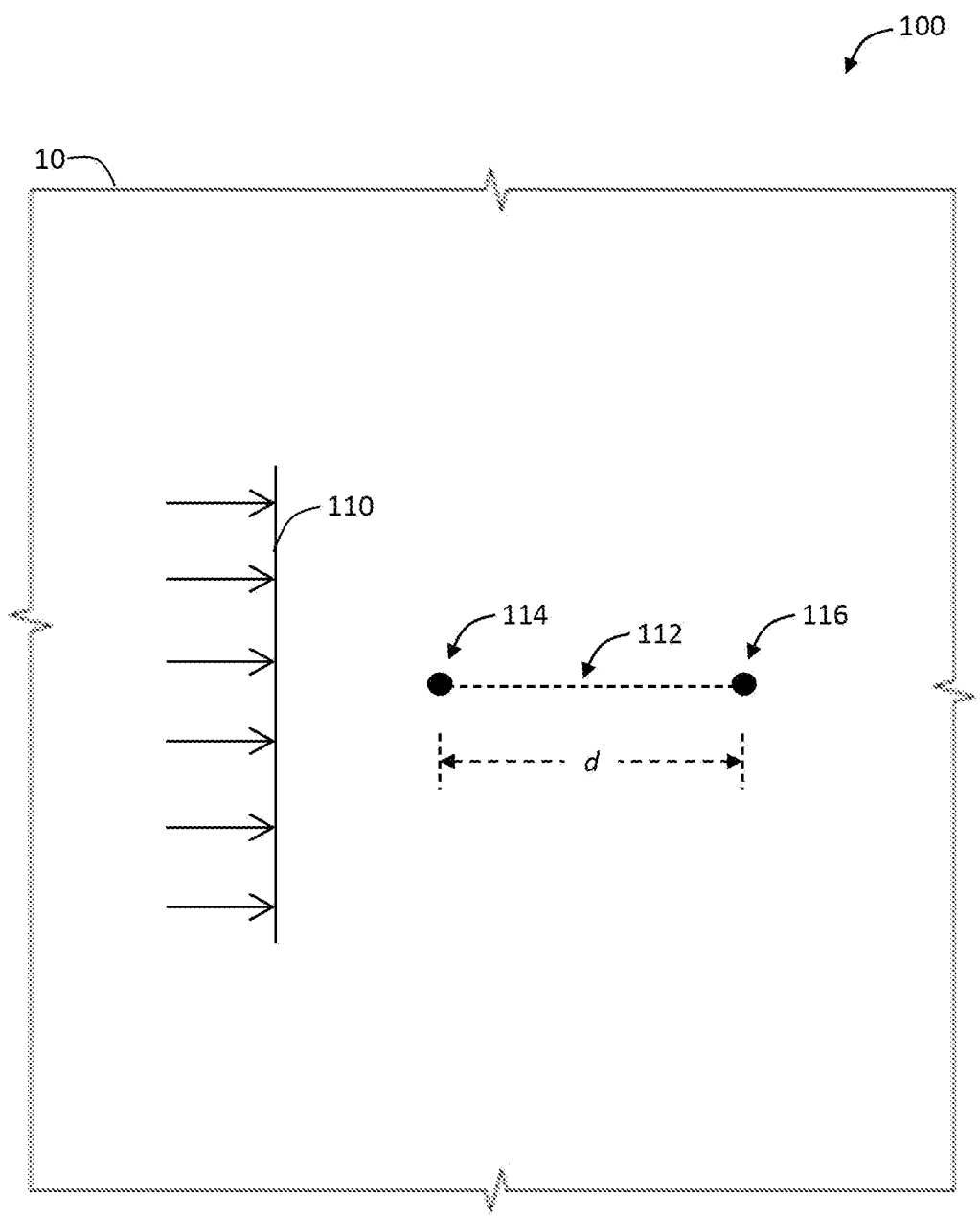
FIG. 1 depicts a first propagation speed estimation directed to a wave front arriving perpendicular with respect to two measurement points defined by a remote tension measurement system of the present invention.

Referring now to FIG. 1, a first propagation speed estimation 100 by a remote tension measurement system of the present invention is described. Viewed from an inflatable structure 10; a transverse wave 110 travels perpendicular to an imaginary line 112 connecting measurement points 114 and 116. The measurement points 114 and 116 are separated by a distance "d".

A sensor such as a scanning laser vibrometer measures displacement perpendicular to a surface of the structure 10 at the measurement points 114, 116 and generates time series records for the measurement points. The cross correlation of the two time series records then yields the time delay "Δt".

The propagation speed is defined by "c=d/Δt". The tension per unit length "T" experienced at the surface of the structure 10 is then derived from the value of "c" by knowing "μ" either from the manufacturer's specifications or by direct measurement.

The first propagation speed estimation 100 assumes that the transverse wave 110 arrives perpendicular to the imaginary line 112. If the transverse wave 110 is generated by a controlled source; then this measurement approach will work. However, a passive measurement that involves the use of existing vibrations that are uncontrolled in the structure 10 may need to accommodate transverse waves that can propagate in any direction along the structure.

Figure 2:
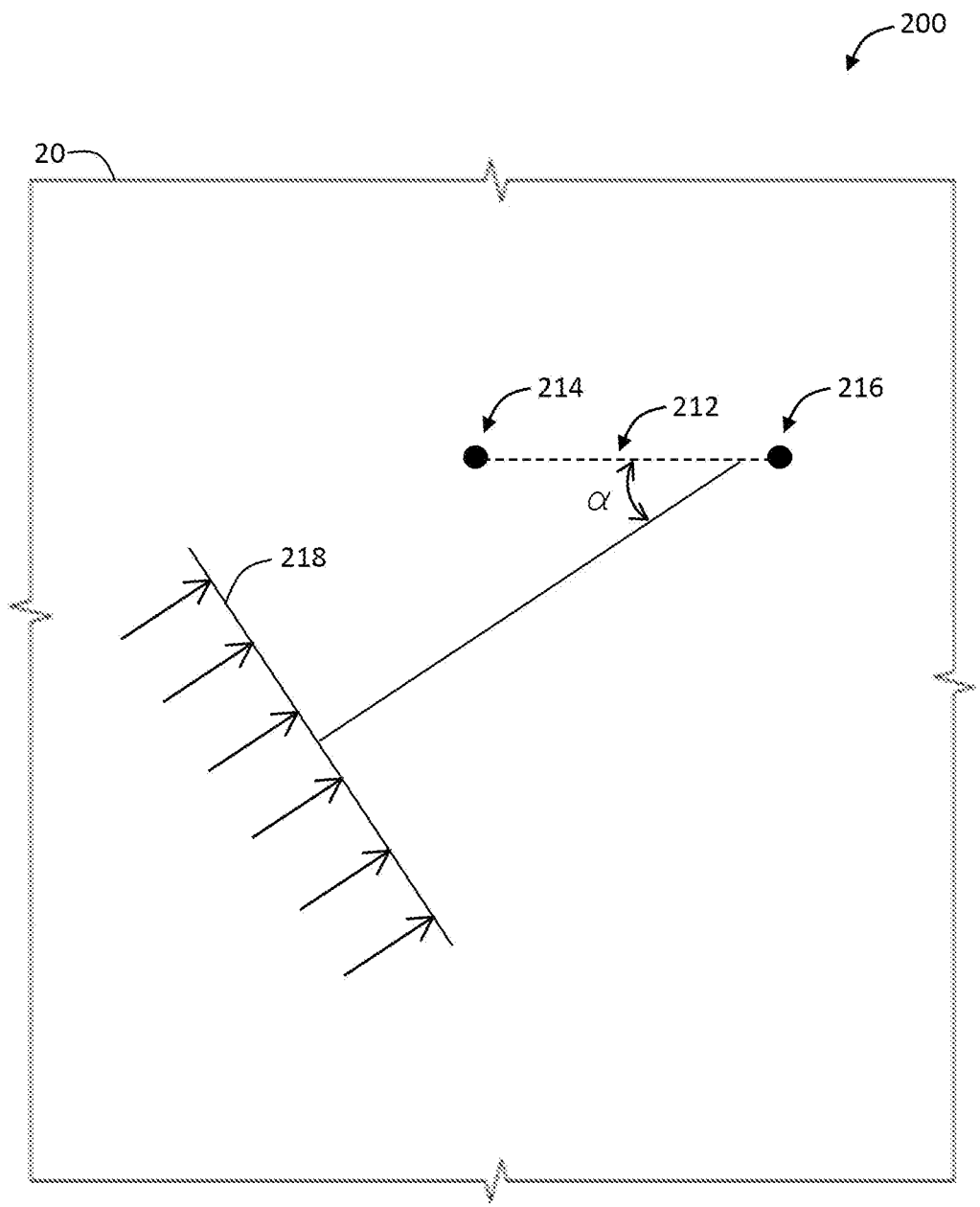
FIG. 2 depicts a second propagation speed estimation directed to a wave front arriving at an angle with respect to two measurement points defined by the tension measurement system.

In FIG. 2 for a structure 20 used with a second propagation speed estimation 200; a transverse wave 218 arrives at an angle "α" with respect to an imaginary line 212 connecting measurement points 214 and 216. In this scenario, the propagation speed is defined by "c/cos α". Because "α" can vary continuously from 0 to "π/2"; it follows that the apparent propagation speed can vary continuously from "c" to infinity (∞).

A propagation speed of infinity corresponds to a wave front that is parallel to the imaginary line 212 so that such a wave front simultaneously reaches the measurement points 214 and 216. To account for this eventuality, an array of more than two measurement points may be employed by the system to obtain an estimate of the propagation speed.

Figure 3:
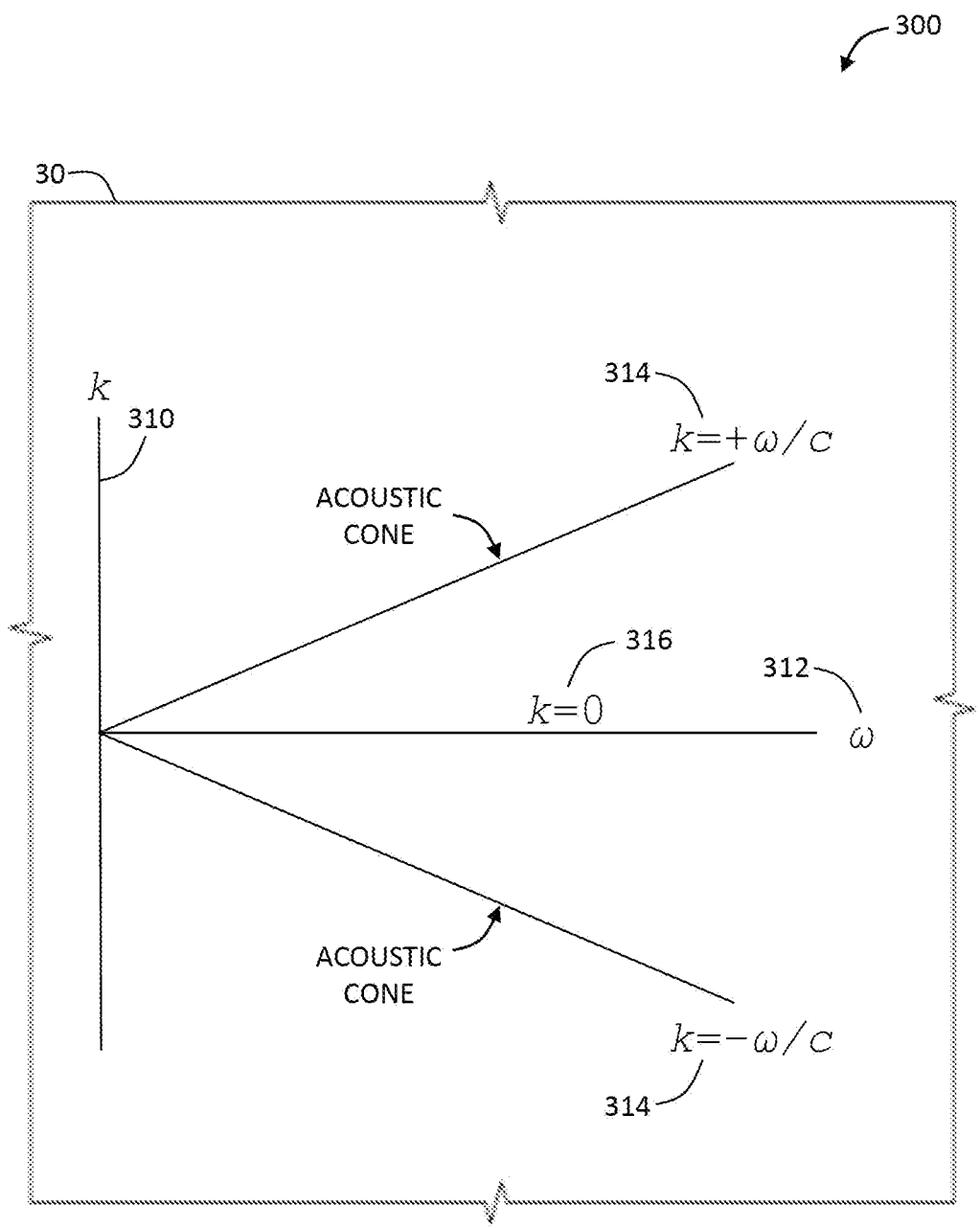
FIG. 3 depicts a third propagation speed estimation directed to a wave front arriving at an angle with respect to a line array of measurement points defined by the tension measurement system.

In FIG. 3, a third propagation speed estimation solution 300 is illustrated. The system operates a sensor such as a laser vibrometer to form a line array of measurement points on a surface of a structure 30. A "k–ω" analysis is then performed where "k=ω/c=2π/λ" is the wavenumber 310, "ω=2πf" is the angular frequency 312, "f" is the frequency and "λ" is the wavelength.

A "k–ω" plot is a two-dimensional Fast Fourier Transform (FFT); that is, an FFT in the spatial direction and an FFT of each time series. Assuming a plurality of transverse waves with a random distribution of propagation angles 314; the energy is displayed in the k-w plot inside the acoustic cone. The outer edges of the acoustic cone are defined by energy characterized by a propagation speed of "c", and the energy along a line 316 defined by k=0 is characterized by a propagation speed of infinity. Once the outer edges of the cone are defined; the propagation speed becomes known and the tension is estimated.

Figure 4:
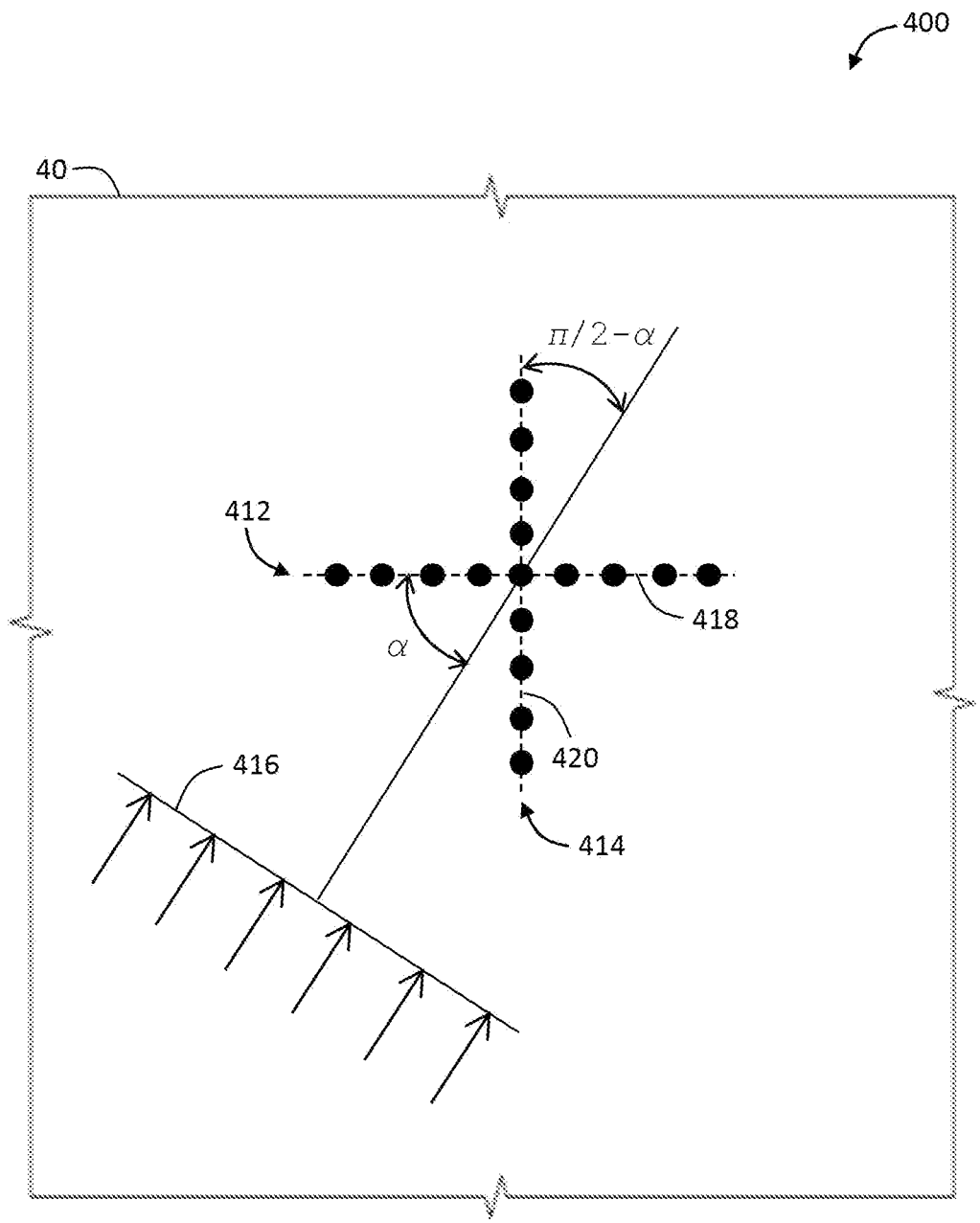
FIG. 4 depicts a fourth propagation speed estimation directed to a wave front arriving at an angle with respect to a Mills Cross array of measurement points defined by the tension measurement system.

In a fourth propagation speed estimation 400 illustrated in FIG. 4; the system operates a laser vibrometer to form a Mills Cross array of a structure 40. The Mills Cross array are line arrays 412 and 414 of measurement points that are positioned perpendicular to each other. The time delay as a function of separation and the apparent propagation speed is then estimated by the system in each direction.

A wave front 416 arriving at an angle "α" with respect to a first imaginary line 418 connecting the measurement points of the line array 412 will be at the same time at an angle $\pi/2-\alpha$ with respect to a second imaginary line 420 connecting the measurement points of line array 414.

Thus, the apparent propagation speed with respect to the first imaginary line 418 will be $c_1 = c/\cos \alpha$, and the apparent propagation speed will be $c_2 = c/\cos(\pi/2-a) = c/\sin \alpha$ with respect to the second imaginary line 420. Taking the ratio of the propagation speeds leads to Equation (3):

$$\frac{c_1}{c_2} = \frac{c/\cos \alpha}{c/\sin \alpha} = \tan \alpha \quad (3)$$

Taking the inverse tangent of the result determines "$\alpha$" and, by extension "c" and "T".

In another embodiment, a hybrid solution approach is used whereby the system operates a sensor (e.g., a laser vibrometer) to form a Mills Cross array, and then also forms two k–ω plots from the two line arrays. This hybrid measurement approach provides increased accuracy in comparison to a single k–ω plot and serves as confirmation for the above methods.

As described above, Equation (2) for estimating "T" pertains to an inflated structure in air. An inflated structure in water is governed by Equation (4):

$$c = \sqrt{\frac{T}{\mu + \mu_a}} \quad (4)$$

where "$\mu_a$" is the added mass per unit area due to the surrounding water. The value of $\mu_a$ depends on the shape of the structure.

Tables of added mass coefficients for common structures exist in the art, as do methods to compute such coefficients for an arbitrarily shaped structure. Also, a structure inflated with water and immersed in water has a different added mass relative to a structure inflated with air and immersed in water, because water contacts both membrane surfaces for the former structure.

As described above, the propagation speed can be estimated when the distance "d" between adjacent measurement points is known. For example, assume that the non-invasive sensor is a scanning laser vibrometer. If the structure surface is perpendicular to the laser, then "d" is equal to the distance established by the scanning laser vibrometer. If the surface is at an angle with respect to the laser; then the distance between each measurement point and the laser vibrometer receiver can be estimated via a time-of-arrival measurement or by other methods.

The surface of the structure should be sufficiently flat between the measurement points so that the curvature does not affect the estimate. Required flatness is ensured by defining the measurement points to be sufficiently close to each other. Because the propagation speed for transverse waves in a membrane is comparatively very low; a comparatively very small separation between measurement points can lead to a comparatively easily resolvable time delay.

As a test, the effective separation distance can be incrementally reduced and the estimated propagation speed can be recalculated. If no change in the estimated propagation speed is detected, then the measurement is not likely affected by curvature.

An alternative approach to defining measurement points is to mark the intended measurement points with reflecting tape on a surface of the structure. Doing so, removes the step of estimating the distance between the measurement points because the distance between the measurement points would be known. Furthermore, the measurement points can be located in a region where the curvature of the inflatable structure surface is negligible.

Embodiments of the present invention monitor the structural health of an inflatable structure by measuring and analyzing the propagation speed of the transverse waves. A crack or flaw in the structure that is large enough to affect the transverse propagation speed can trigger an alert if the change in propagation speed relative to a baseline measurement exceeds a preset threshold.

Computational resources configured in communication with non-invasive transverse wave sensing structure(s) tasked with monitoring an inflatable structure cooperate to measure and analyze transverse waves that propagate in the structure, and then estimate the structural health of the inflatable structure using changes in those transverse wave propagation measurements.

Figure 5:
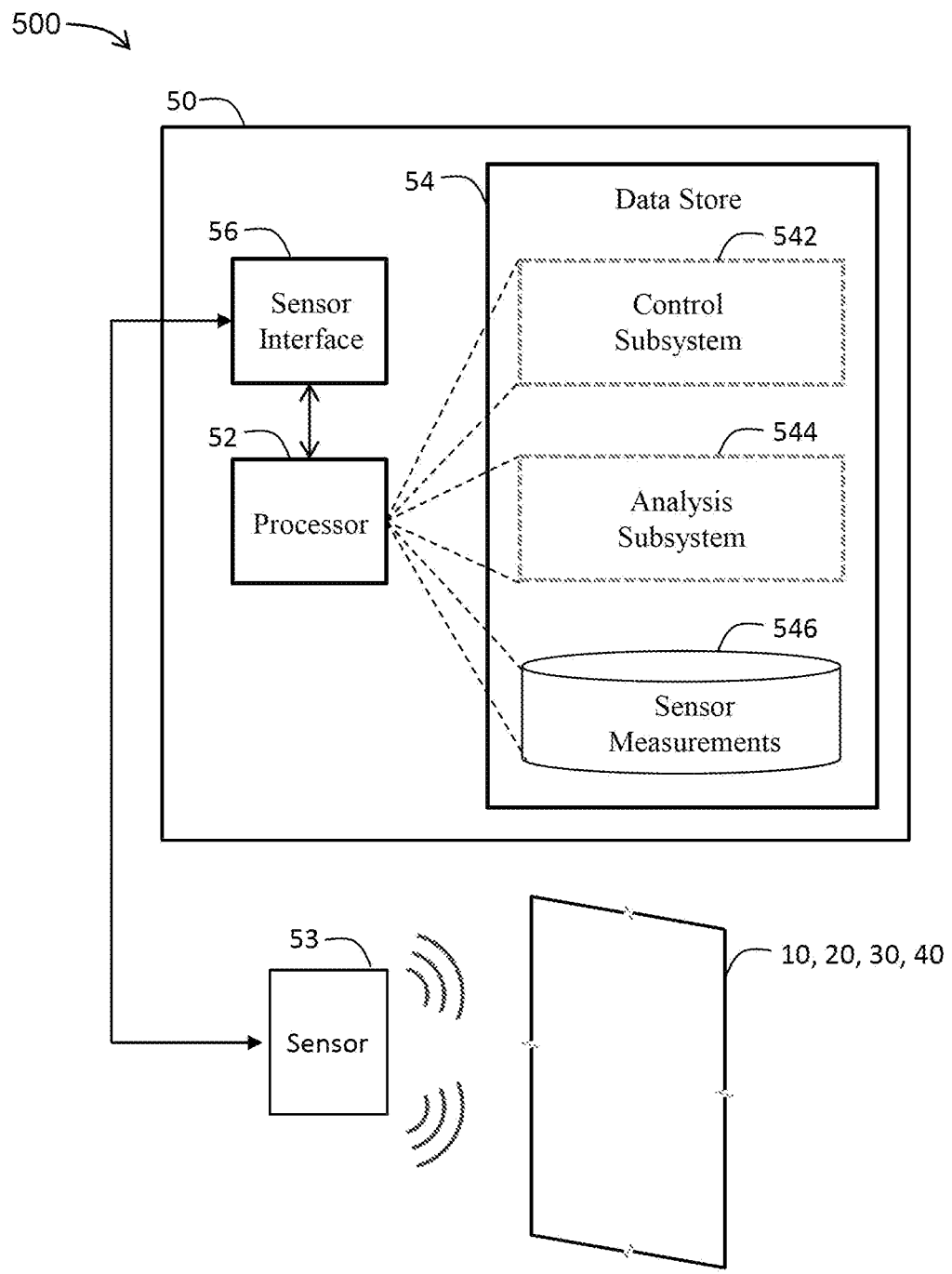
FIG. 5 depicts the remote tension measurement system of the present invention for structural health monitoring of inflatable structures using a non-invasive sensor.

Referring to the diagram of FIG. 5, a remote tension measurement system 500 comprises a computing resource 50 with a processor 52 that accepts and executes computerized instructions, and also a data store 54 that stores data and instructions used by the processor.

The computerized instructions of the tension measurement system 500 can implement a control subsystem 542, an analysis subsystem 544, and a sensor measurements database 546 stored in the data store 54 and retrieved by the processor 52 for execution. Implementation of the tension measurement system 500 may employ any or all of the control subsystem 542, analysis subsystem 544, and/or sensor measurements database 546 collocated upon a single host computing resource 50 or distributed among two or more host computing resources.

The control subsystem 542 allows the processor 52 to operate a sensor interface 56 to transmit and receive data in exchange with non-invasive or minimally invasive sensor devices 53 to detect transverse vibrations propagating along the inflatable structure surfaces 10, 20, 30 and 40.

The analysis subsystem 544 allows the processor 52 to record and retrieve transverse wave data using the sensor measurements database 546 and to determine respective time delays for sensed transverse waves propagating toward system-defined measurement points and, by inference, respective changes in the structural health of a region established by those measurement points.

The analysis subsystem 544 uses various algorithms to measure the time delay between measurement points along an inflatable structure. For example, performing a cross-correlation of time series signals yields the time delay.

The present invention is a remote measurement system that can continuously perform detection and assessments for structural health monitoring, potentially using only the transverse waves that are already present in the inflatable structure of interest.

Most environments introduce vibrations into a structure from a variety of sources. In the unlikely event that the amplitude of uncontrolled vibration is too small to support a measurement; the tension at that time can be recorded as unchanged from a previous measurement in time. If needed, a vibration source can be introduced for measurement purposes.

Figure 6:
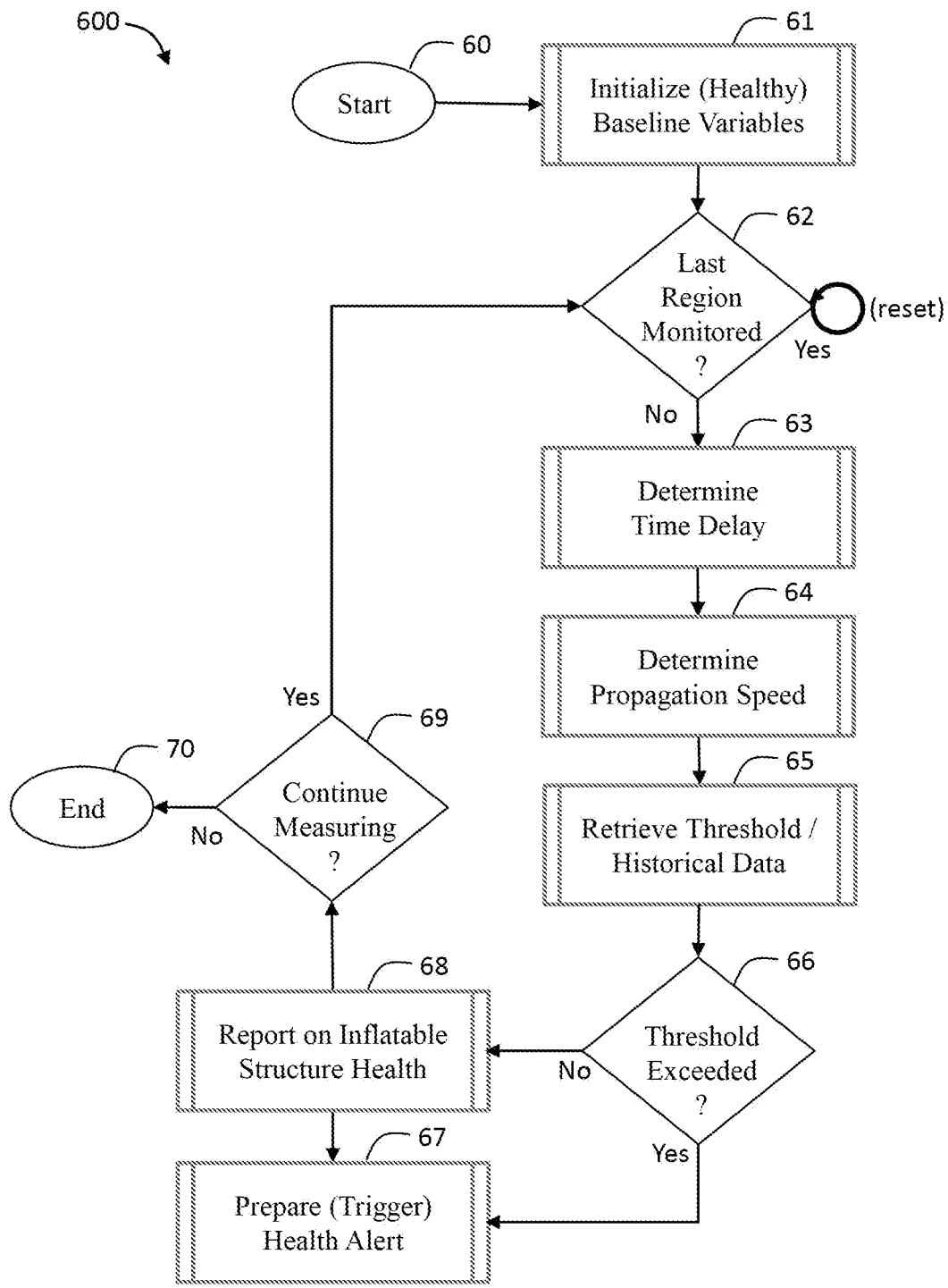
FIG. 6 depicts a flow chart of steps of the method for remote tension measurement.

Referring to FIG. 6 and continuing to refer to FIG. 5; a block diagram 600 illustrates the operational sequence and use of exemplary computer-assisted aspects of the present invention. Starting at block 60, the control subsystem 542 and the analysis subsystem 544 operate the sensors 53 and analyzes readings of the sensors to perform an initialization at block 61 of known values to be used in calculating transverse wave measurement.

The known values include a spacing distance between points defining a measurement region of an inflatable structure 10, 20, 30, 40 and threshold values representative of the structure in a known healthy state. At block 62, the control subsystem 542 uses the sensor interface to operate the employed sensors 53 in order to detect a transverse wave propagating through the structures 10, 20, 30 and 40. The control subsystem 542 may continue to loop on block 62 for each measurement region of the structures 10, 20, 30 and 40 in order to trigger determination of a time delay(s) at block 63 during which the transverse wave propagates the measurement region.

At block 64, the analysis subsystem 544 uses the time delay(s) and spacing distance(s) to determine a propagation speed of the transverse wave for the employed measurement region(s). At block 65, the analysis subsystem 544 retrieves alert threshold value(s) for the measurement region (and, as needed, previously determined and stored propagation speed (s) for that measurement region).

If, at block 66, the analysis subsystem 544 detects that the most recently captured transverse wave propagation speed for the measurement region does not exceed the threshold value and/or a maximum allowable change from a previous measurement for that measurement region; then at block 68, the analysis subsystem 544 delivers a positive (e.g., success condition) report on the structural health of the monitored inflatable structure 10, 20, 30 or 40.

For example, the analysis subsystem 544 may command the control subsystem 542 to instruct a user interface to display the health status, and/or to forward the health status to a downstream application for further processing. However, if at block 66, the analysis subsystem 544 detects that the most recently captured transverse wave propagation speed for the measurement region exceeds the threshold value and/or a maximum allowable change from a previous measurement for that measurement region; then at block 67, the analysis subsystem 544 can alert flagging damage detected in the monitored structure 10, 20, 30 and 40.

At block 68, this alert may be conveyed as a negative (alert condition) report on the structural health of the monitored structures 10, 20, 30 or 40. For example, the analysis subsystem 544 may command the control subsystem 542 to instruct a user interface to display the alert, and/or forward the alert to a downstream application for further processing. If ongoing structural health monitoring for the inflatable structure 10, 20, 30 or 40 is required at block 69, the process may be repeated starting at the transverse wave detection loop at block 62. If not, operation of the remote tension measurement system ends at block 70.

Unlike conventional ultrasonic non-destructive testing approaches, the present invention detects changes in the tension for the region of inflatable structure being measured. This approach provides a representative measure of the structural integrity of the inflatable structure.

The present invention could be used instead of known non-destructive testing and scanning systems; or, alternatively, the invention could first identify regions of the inflatable structure that are potentially damaged, and then the non-destructive testing would focus on those regions to image the causes of the damage. The present invention can also be used during shock and vibration tests of inflatable structures without the need for strain gages or other tension measurement devices.

The present invention provides a significant advantage for inflatable structures relative to conventional structures in that structural health monitoring can be accomplished remotely. Such non-invasive measurement is not possible with conventional structures except for handheld or automated devices using infrared, ultrasonic, Terahertz, or other non-destructive testing approaches. These methods are very slow, can only be done at very close ranges, and can only detect the specific types of structural flaws that they are designed to measure.

The present invention is scalable in the inflatable structure size as well as the transverse vibration magnitude and is safer by being non-invasive with the result of being widely applicable for numerous inflatable structures.

The present invention may be advantageously employed in some industrial processes such as paper manufacturing. Various known methods measure the tension of sheets of paper and other materials as they are transferred between rollers. Application of the remote tension measurement system of the invention to such processes would be very similar to the process described above. The manufacturing process itself likely introduces transverse waves of sufficient amplitude into the sheets of material to support a tension measurement.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for monitoring structural health of a membrane formed structure, said method comprising the steps of:
    initializing a plurality of baseline values including a spacing distance and a known mass of the membrane formed structure;
    determining a plurality of measurement points based on the spacing distance and the known mass;
    defining a measurement region of the membrane-formed structure with the plurality of measurement points;
    detecting a propagation event for a transverse wave along the measurement region;
    determining a propagation speed for the transverse wave;
    determining a tension for the measurement region based on the propagation speed;
    wherein said step of determining the plurality of measurement points defining the measurement region further comprises determining a pair of the measurement points positioned along an imaginary line at the spacing distance;
    wherein said step of determining the propagation speed step further comprises determining a first time delay for the transverse wave propagating between the pair of the measurement points along a displacement perpendicular to the imaginary line and determining the propagation speed for the transverse wave based on the first time delay and the spacing distance; and
    wherein determining the propagation speed step further comprises determining a second time delay for the transverse wave propagating between the pair of the measurement points along a displacement angle "α" to the imaginary line and determining the propagation speed for the transverse wave based on the second time delay and using c/cos α wherein "c" is the propagation speed and 0<α<π/2.

2. The method in accordance with claim 1, said method further comprising the steps of incrementally reducing subsequent measurement regions;
   detecting subsequent propagation speeds based on the subsequent measurement regions; and
   determining a change rate for the subsequent propagation speeds such that if is there is no change in the detected propagation speeds then the measurement regions are not likely affected by curvature.

3. The method in accordance with claim 1, wherein said step of determining a plurality of measurement points comprises marking the determined measurement points with reflecting tape.

4. The method in accordance with claim 1, for further comprising the step of recording a tension of the measurement region as unchanged from a previous tension of the measurement region in time when the tension from said determining the tension of the measurement region step cannot support a measurement.

5. The method in accordance with claim 1, further comprising the steps of identifying regions of the structure characterized by a damage;
   defining a potentially damaged region; and
   imaging the regions of the structure that are potentially damaged for the cause of the damage.

6. The method in accordance with claim 5, further comprising the step of triggering an alert if the damage of the regions of the structure affects the transverse propagation speed to exceed a preset threshold.

7. The method in accordance with claim 6, wherein said method is employed in paper manufacturing; and
   wherein said determining a tension for the measurement region step is based on a propagation speed of material transferred between rollers used in paper manufacturing when transverse waves of sufficient amplitude are transferred into the material.

8. A method for monitoring structural health of a membrane formed structure, said method comprising the steps of:
   initializing a plurality of baseline values including a spacing distance and a known mass of the membrane formed structure;
   determining a plurality of measurement points based on the spacing distance and the known mass;
   defining a measurement region of the membrane-formed structure with the plurality of measurement points;
   detecting a propagation event for a transverse wave along the measurement region;
   determining a propagation speed for the transverse wave; and
   determining a tension for the measurement region based on the propagation speed;
   wherein said step of determining the plurality of measurement points defining the measurement region further comprises determining a line array of at least three of the measurement points positioned along an imaginary line at the spacing distance and wherein said step of determining the propagation speed further comprises determining the propagation speed for the transverse wave based on a k–ω plot acoustic cone.

9. A method for monitoring structural health of a membrane formed structure, said method comprising the steps of:
   initializing a plurality of baseline values including a spacing distance and a known mass of the membrane formed structure;
   determining a plurality of measurement points based on the spacing distance and the known mass;
   defining a measurement region of the membrane-formed structure with the plurality of measurement points;
   detecting a propagation event for a transverse wave along the measurement region;
   determining a propagation speed for the transverse wave; and
   determining a tension for the measurement region based on the propagation speed;
   wherein said step of determining the plurality of measurement points defining the measurement region further comprises determining a Mills Cross array of at least a first three of the measurement points positioned along a first imaginary line and at least a second three of the measurement points positioned along a second imaginary line at the spacing distance and wherein said step of determining the propagation speed further comprises determining, for the transverse wave propagating along a displacement angle "α" to the first imaginary line and along a displacement angle "π/2−α" to the second imaginary line, the propagation speed for the transverse wave using c/cos α with respect to the first imaginary line and c/sin α with respect to the second imaginary line wherein "c" is the propagation speed.

10. A method for monitoring structural health of a membrane formed structure, said method comprising the steps of:
    initializing a plurality of baseline values including a spacing distance and a known mass of the membrane formed structure;
    determining a plurality of measurement points based on the spacing distance and the known mass;
    defining a measurement region of the membrane-formed structure with the plurality of measurement points;
    detecting a propagation event for a transverse wave along the measurement region;
    determining a propagation speed for the transverse wave; and
    determining a tension for the measurement region based on the propagation speed;
    wherein said step of determining the tension for the measurement region based on the propagation speed further comprises determining the tension for the measurement region in water using $c=\sqrt{T\mu+\mu a}$ where "μa" is the added mass per unit area due to the surrounding water and the value of μa depends on the shape of the membrane-formed structure.

11. A computer-implemented method monitoring structural health of a membrane-formed structure using at least one processor configured with executable instructions to perform the steps of:
    initializing a plurality of baseline values including a spacing distance and a known mass of the membrane formed structure;
    determining a plurality of measurement points based on the spacing distance and the known mass to define a measurement region of the membrane-formed structure;
    detecting, using a non-invasive sensor, a propagation event for a transverse wave along the measurement region;
    determining a propagation speed for the transverse wave;
    determining a tension for the measurement region based on the propagation speed;
    wherein said step of determining the propagation speed further comprises determining a first time delay for the transverse wave propagating between a pair of the measurement points along a displacement perpendicular to the imaginary line;

determining the propagation speed for the transverse wave based on the first time delay and the spacing distance;

determining a second time delay for the transverse wave propagating between the pair of the measurement points along a displacement angle "$\alpha$" to the imaginary line; and determining the propagation speed for the transverse wavebased on the second time delay and using $c/\cos\alpha$ wherein "c" is the propagation speed and $0<\alpha<\pi/2$.

12. A computer-implemented method monitoring structural health of a membrane-formed structure using at least one processor configured with executable instructions to perform the steps of:

initializing a plurality of baseline values including a spacing distance and a known mass of the membrane formed structure;

determining a plurality of measurement points based on the spacing distance and the known mass to define a measurement region of the membrane-formed structure;

detecting, using a non-invasive sensor, a propagation event for a transverse wave along the measurement region;

determining a propagation speed for the transverse wave;

determining a tension for the measurement region based on the propagation speed;

wherein said step of determining the plurality of measurement points defining the measurement region, further comprises determining a Mills Cross array of at least a first three of the measurement points positioned along a first imaginary line and of at least a second three of the measurement points positioned along a second imaginary line at the spacing distance;

wherein said step of determining the propagation speed further comprises determining for the transverse wave propagating along a displacement angle "$\alpha$" to the first imaginary line and along a displacement angle "$\pi/2-\alpha$" to the second imaginary line; and determining the propagation speed for the transverse wave using $c/\cos\alpha$ with respect to the first imaginary line and $c/\sin\alpha$ with respect to the second imaginary line wherein "c" is the propagation speed.

13. A remote tension measurement system, comprising:

a non-invasive sensor; and at least one processor configured to initialize a plurality of baseline values with a spacing distance and a known mass of a membrane-formed structure, to determine a plurality of measurement points based on the spacing distance and the known mass to define a measurement region of the membrane-formed structure, to detect a propagation event with said sensor for a transverse wave along the measurement region, to determine a propagation speed for the transverse wave, and to determine a tension for the measurement region based on the propagation speed;

wherein said at least one processor is further configured to determine a Mills Cross array of at least a first three of the measurement points positioned along a first imaginary line and of at least a second three of the measurement points positioned along a second imaginary line at the spacing distance; and wherein said at least one processor is further configured to determine the propagation speed for the transverse wave propagating along a displacement angle "$\alpha$" to the first imaginary line and along a displacement angle "$\pi/2-\alpha$" to the second imaginary line using "$c/\cos\alpha$" m with respect to the first imaginary line and "$c/\sin\alpha$" with respect to the second imaginary line wherein "c" is the propagation speed.

* * * * *